Dec. 10, 1935.  E. B. THOMPSON  2,023,716
TRANSMISSION DRIVE MECHANISM FOR TOY AUTOMOBILES
Filed Oct. 8, 1932
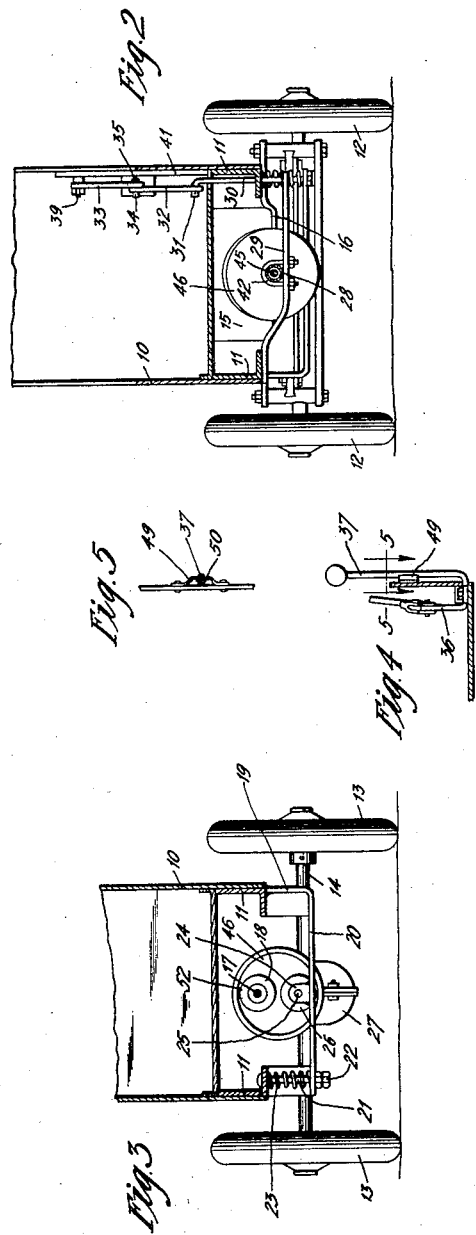
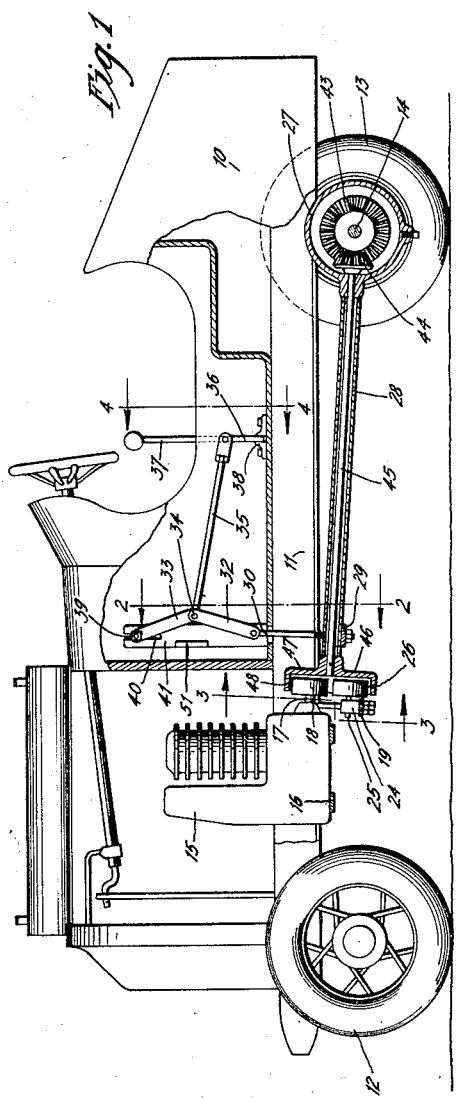
Inventor
Elmer B. Thompson
by Orwig & Hague Attys.

Patented Dec. 10, 1935

2,023,716

UNITED STATES PATENT OFFICE 2,023,716

TRANSMISSION DRIVE MECHANISM FOR TOY AUTOMOBILES

Elmer B. Thompson, Des Moines, Iowa, assignor to National Sales & Manufacturing Company, Des Moines, Iowa, a corporation of Iowa Application October 8, 1932, Serial No. 636,957

9 Claims. (Cl. 180—70)

This invention relates to improvements in self-propelled toy automobiles to be driven and operated by children, and pertains more particularly to mechanism for transmitting power from a small internal combustion engine to the rear axle of the automobile.

The object of my invention is to provide a simple, durable and inexpensive mechanism adapted to transmit power from the engine to the rear axle, said mechanism having a single control lever so arranged that its operation may be easily controlled and understood, said lever being so arranged that the engine may be frictionally connected to and disconnected from the rear axle in such a manner that forward movement of the lever will cause the automobile to move forwardly and the rearward movement of the lever will cause the automobile to move rearwardly.

A further object is to provide a simple transmission mechanism in which tooth gears are eliminated, wherein the movement of a single lever will perform all of the necessary functions of controlling the movement of the automobile, thereby eliminating the clutch control mechanism such as provided in an ordinary automobile.

A further object is to provide in a toy automobile employing a transmission drive device improved mechanism for controlling the movement of said drive device to stop and start the automobile.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of a toy automobile in which is included my improved mechanism, a portion of the automobile body being shown in section, and also the transmission gear mechanism.

Figure 2 is a sectional view taken on the line 2—2 of Figure 1.

Figure 3 is a sectional view taken on the line 3—3 of Figure 1.

Figure 4 is a detail sectional view taken on the line 4—4 of Figure 1; and

Figure 5 is a detail sectional view taken on the line 5—5 of Figure 4.

In the drawing I have used the numeral 10 to indicate the body of the automobile, including parallel frame members 11 supported by steering wheels 12 and drive wheels 13. The wheels 13 are mounted on an axle 14, one of said wheels being fixed to said axle, while the other wheel is rotatively mounted thereon.

Supported in the forward end of the frame 10 and between the members 11 is an internal combustion engine 15, said engine being supported by means of transversely arranged cross bars 16 secured to the members 11. The engine 15 is provided with a rearwardly extending power shaft 17 having a friction pinion 18 fixed thereon.

Fixed to one of the frame members 11 is a downwardly extending bar 19 terminating in the laterally extending portion 20, extending transversely beneath the frame members 11 and beneath the shaft 18. The free end of the bar 20 is supported by a downwardly extending bolt 21 from the other frame member 11. The free end of said bar 20 rests on nuts 22 carried by said bolt. A spring 23 is provided for yieldably holding the bar 20 in its lower position of movement.

The central portion of said bar 20 is provided with an upwardly extending flange 24 designed to support a stub shaft 25 on which an idler friction wheel 26 is mounted, said idler wheel being substantially of the same diameter as the wheel 18, and designed to be moved into and out of contact therewith. The said wheel 26 rests normally out of contact with the wheel 18 with the free end of the bar 20 on the nuts 22.

Pivotally mounted on the central portion of the axle 14 is a gear casing 27, the forward side of which is provided with a torque tube 28 extending forwardly and terminating near the pinions 18 and 26. The forward end of said tube is fixed to and carried by a bar 29 supported transversely below the members 11. One end of said bar is fixed to one of the frame members 11.

The free end of the bar 29 is supported by a vertical rod 30 slidably mounted in the other frame member 11, as clearly illustrated in Figure 2. The upper end of the rod 30 has a laterally extending portion 31 to serve as a pivot member for the lower end of a link 32. The upper end of the link 32 is pivotally connected to a second link 33 by means of a pivot member 34.

Said pivot member 34 comprises a laterally extending portion formed of a link 35 pivotally connected to an operating arm 36 forming a portion of the lever 37. Said lever 37 is pivotally connected to the automobile frame by means of a bearing 38 in the manner clearly illustrated in Figures 1 and 4.

The upper end of the link 33 is mounted on a pivot member 39 slidably mounted in a suitable groove 40 carried by an upright bar 41 secured to one of the frame members 11. The pivot member is adjustably mounted in said groove to take up wear in the connections and between the friction wheels, and their co-operating friction member hereinafter described. The forward end of the tube 28 is secured to the bar 29 by means of a U-bolt 42.

Supported within the gear casing 27 and fixed to the shaft 14 is a beveled gear 43 designed to mesh with a pinion 44 secured on the rear end of the drive shaft 45. The forward end of the shaft 45 is provided with what I shall term an internal friction member 46, said member comprising a disk 47 having an annular flange 48 supported around both of the friction wheels 18 and 26 in the manner clearly illustrated in Figure 1.

The said internal friction flange 48 is supported normally to clear both of said friction wheels and held in said normal position by means of the link mechanism 32, 33 and 35 and the lever 37. Said lever 37 is designed to rest against a friction plate 49 having a notch 50 for receiving the lever when in the neutral position.

The operation of my improved transmission is as follows:

Assuming that the engine 15 is running and that the lever 37 is in its neutral or normal position, then the flange 48 will be disengaged from both of the wheels 18 and 26. If it is desired to cause the automobile to move forwardly, then the lever 37 is grasped and moved forwardly, causing the links 32 and 33 to be moved into alinement with the pivot member 34 slightly past dead center, and with the said links against a stop 51 carried by the bar 41.

The rod 30 will then be moved downwardly, causing the free end of the bar 29 to be lowered until the flange 48 engages the top surface of the wheel 18. Said flange 48 will then be rotated from the wheel 18 by frictional contact, causing the shaft 45 to be rotated and in turn the axle 14. Rearward movement of the lever 37 will then elevate the flange 48 and cause disconnection between the engine and the rear axle.

Further rearward movement of the lever 37 will cause the flange 48 to be elevated and to engage the under surface of the idler wheel 26, and continued rearward movement of the lever 37 will cause the idler wheel 26 to be elevated and to engage the wheel 18, at which time reverse movement will then be imparted to the flange 48.

To reverse the automobile, the lever 37 is moved rearwardly, thus elevating the flange 48 and the flange engages the wheel 26 and moves it upwardly against the pressure of the spring 21 until the wheel 26 frictionally engages the wheel 18 on the engine shaft.

The adjustable pivot 39 provides means for adjusting the link 33 to overcome wear between the wheel 18 and the internal friction flange 48, so that the said members may be locked in frictional engagement when the link 33 is at its forward position of movement.

Thus it will be seen that I have provided a very simple transmission drive mechanism which is controlled by a single operating lever, the operation of which may be easily learned by a very small child, and so arranged that considerable abuse in its operation may take place without damage to the mechanism.

By providing friction wheels 18 and 26, and the friction flange 48, the ordinary friction clutch may be entirely eliminated. The said wheels 18 and 26 are preferably faced with yieldable material such as rubber or fiber, designated by the numeral 52. This facing may be secured to the wheels in any desired manner common to friction wheels of similar nature now in common use.

I claim as my invention:

1. In a device of the class described, a pair of spaced frame members, an axle supported transversely thereof, a torque tube supported between said frame members, a gear casing pivoted on said axle and secured to the rear end of said torque tube, a prime mover having a power shaft, a friction drive wheel on said power shaft, a stub shaft parallel with said power shaft, a bar supported transversely of the frame members and having one end connected to one of said frame members and carrying said stub shaft, an idler friction wheel on said stub shaft spaced from the drive wheel, a drive shaft in said tube, means operatively connecting the rear end of said drive shaft with said axle, an internal friction flange carried by the forward end of said drive shaft and encasing both of said wheels, and means for moving said flange into contact with said driving wheel to rotate the drive shaft in one direction and for moving it in the opposite direction to engage the idler wheel and to move the idler wheel into engagement with the drive wheel for reversing the operation of said drive shaft.

2. In a device of the class described, a pair of spaced frame members, an axle supported transversely thereof, a torque tube supported between said frame members, a gear casing pivoted on said axle and secured to the rear end of said torque tube, a prime mover having a power shaft, a driving friction wheel on said power shaft, a stub shaft parallel with said power shaft, a bar supported transversely of the frame members and having one end connected to one of said frame members and carrying said stub shaft, an idler friction wheel on said stub shaft spaced from the driving wheel, a drive shaft in said tube, means for operatively connecting the rear end of said drive shaft with said axle, an internal friction flange carried by the forward end of said drive shaft and encasing both of said wheels, a second transversely arranged bar having one end fixed to one of said frame members, means for securing the forward end of said torque tube to the central portion of said bar, link mechanism for elevating and lowering the free end of said bar and for locking the bar in its lowered position of movement, and a single lever for controlling the movement of said link mechanism.

3. In a device of the class described, a pair of spaced frame members, an axle supported transversely thereof, a torque tube supported between said frame members, a gear casing pivoted on said axle and secured to the rear end of said torque tube, a prime mover having a power shaft, a friction wheel on said power shaft, a second friction wheel adapted to operate in a reverse direction from the first friction wheel, a drive shaft in said tube, means operatively connecting the rear end of said drive shaft with said axle, an internal friction flange carried by the forward end of said drive shaft and encasing both of said wheels, a bar supported transversely between said frame members and having one end attached to one frame member and its opposite end mounted to move in a plane parallel to both of said friction wheels, means for fixing the forward end of said torque tube to said bar, and a lever operated means for elevating and lowering the free end of said bar whereby the inner surface of said internal friction flange will be caused to engage one or the other of said friction wheels and motion imparted to said drive shaft in the corresponding direction.

4. In a device of the class described, a pair of spaced frame members, an axle supported transversely thereof, a torque tube supported between said frame members, a gear casing pivoted on said axle and secured to the rear end of said torque tube, a prime mover having a power shaft, a friction wheel on said power shaft, a second friction wheel adapted to operate in a reverse direction from the first friction wheel, a torque shaft in said tube, means operatively connecting the rear end of said torque shaft with said axle, an internal friction flange carried by the forward end of said torque shaft and encasing both of said wheels, a bar supported transversely between said frame members and having one end attached to one frame member and its opposite end mounted to move in a plane parallel to both of said friction wheels, means for fixing the forward end of said torque tube to said bar, a toggle link mechanism, means pivoting one end of said toggle to said frame, means operatively connecting the opposite end of said toggle to the free end of said bar to elevate and lower the same, a hand actuated lever mechanism for opening and closing said toggle to lower and elevate the free end of said bar, whereby the inner surface of said internal friction flange will be caused to engage one or the other of said friction wheels.

5. In a device of the class described, a frame including a pair of spaced frame members, an axle supported transversely thereof, a prime mover having a power shaft, a transmission element on said shaft, a torque shaft supported parallel with and between said spaced frame members, means for operatively connecting the back end of said torque shaft to said axle, a second transmission element carried by the forward end of said torque shaft and adapted to move into and out of operative relation with the first transmission element, a bar having one end attached to said frame and mounted transversely of said torque shaft, means for mounting the forward end of said torque shaft on said bar, hand lever controlled mechanism for moving the free end of said bar to cause the second transmission element to move into and out of operative relation with the first transmission element, said hand lever controlled mechanism comprising a support having one end fixed to said frame, and a slot in its opposite end, a pivot member adjustably mounted in said slot, a toggle lever having one end mounted on said pivot member, means operatively connecting the opposite end of said toggle lever to said bar, a hand operated lever, and a link operatively connecting said lever and the center of said toggle lever.

6. In a device of the class described, a pair of spaced frame members, an axle supported transversely thereof, a drive shaft supported between said frame members and parallel therewith, means operatively connecting the rear end of said drive shaft to said axle, a prime mover having a power shaft, a friction drive wheel on said power shaft, a bar supported transversely of the frame members having one end connected to one of said frame members, a stub shaft parallel with said power shaft and mounted in said bar, an idler friction wheel on said stub shaft spaced from the first wheel, means for yieldably supporting the free end of said bar against movement in one direction, an internal friction flange carried by the forward end of said drive shaft and encasing both of said wheels, means for moving said friction flange into contact with said drive wheel to rotate the drive shaft in one direction and for moving it in the opposite direction to engage the idler wheel and move the idler wheel into engagement with the drive wheel for reversing the operation of said drive shaft.

7. In a device of the class described, the combination of a frame, a power shaft, a drive shaft, a friction wheel on said power shaft, a stub shaft parallel with the power shaft, a bar supported transversely of said shafts, means for securing one end of said bar to said frame, means securing the stub shaft on the bar at a point intermediately of its ends, a friction wheel on said stub shaft, a wheel mounted on said drive shaft and having an internal friction flange adapted to receive both of said friction wheels, means for yieldably moving the free end of said bar laterally to separate the first and second friction wheels, means for limiting said movement of the bar with the friction wheel out of engagement with said flange, and means for moving said flange to first engage the second friction wheel and upon further movement to cause the second friction wheel to engage the first friction wheel for the purpose stated.

8. In a device of the class described, a frame including a pair of spaced frame members, an axle supported transversely thereof, a prime mover having a power shaft, a transmission element on said shaft, a drive shaft supported parallel with and between said spaced frame members, means for operatively connecting the back end of said drive shaft to said axle, a second transmission element carried by the forward end of said drive shaft and adapted to move into and out of operative relation with the first transmission element, a bar having one end attached to one of said frame members and mounted transversely of said drive shaft, means for mounting the forward end of said drive shaft to said bar, hand controlled mechanism for moving the free end of said bar to cause the second transmission element to move into and out of operative relation with the first transmission element, said mechanism comprising an upright support having its upper end slotted, a pair of link devices having their adjacent ends pivoted, means adjustably mounted in said slotted end for pivotally supporting the upper end of one of said links, means for connecting the other end of said links to the free end of said bar, a hand actuated lever, a link connecting said lever to the pivoted ends of said first links, and means for limiting the movement of the pivoted ends of said links in one direction.

9. In a device of the class described, a supporting frame, an axle supported transversely thereof, a prime mover having a drive element, a driven element adapted to be moved into and out of operation with the drive element, means for operatively connecting the driven element to said axle, means for moving the driven element into and out of operative relation with said drive element, said means comprising a toggle lever mechanism having one end fixed and the other end connected to said driven element, a hand actuated lever, and means for operatively connecting the hand actuated lever to said toggle lever device whereby the driven element will be locked in operative relation with the driving element as the toggle levers are moved to a dead center position.

ELMER B. THOMPSON.